Patented Dec. 9, 1947

UNITED STATES PATENT OFFICE

2,432,296

STABILIZED CHLORINE CONTAINING POLYMERS

George Lowrance Dorough, Niagara Falls, N. Y., assignor to E. I. du Pont de Nemours & Company, Wilmington, Del., a corporation of Delaware No Drawing. Application February 25, 1944, Serial No. 523,937

14 Claims. (Cl. 260—78.5)

This invention relates to new compositions of matter and more particularly to chlorine-containing polymer compositions which are resistant to the effects of light and heat.

Various chlorine-containing polymers have found wide commercial use in films, fibers, spinning, coating compositions for fabric, and in the production of shaped articles by molding or extrusion. In general, these chlorine-containing resins, as exemplified by polyvinyl chloride, copolymers of vinyl chloride and similar chlorine-containing vinyl polymers, have only moderate resistance to the deteriorating effects of heat and light. For example, severe exposure to heat and/or light usually brings about discoloration accompanied by loss of strength and toughness that seriously hampers the use of these materials for many applications. This is particularly true for the fabrication of articles by injection molding, calendering, or extrusion operations which require heating the plastic composition for some time at temperatures above its softening point. In addition, when these resins are exposed to heat and/or light, substantial amounts of hydrogen chloride are often liberated, which may attack extrusion or molding equipment or bring about premature failure of coated cloth due to tendering of the fabric base.

The invention therefore has as an object to provide chlorine-containing polymers which are substantially resistant to discoloration and degradation by the action of heat and/or light. Other objects will be apparent from the description given hereinafter.

These objects are accomplished by the invention of compositions comprising a chlorine-containing polymer and as a stabilizer against deterioration by light and heat an aliphatic mercapto alcohol.

In the practice of this invention, stable chlorine-containing polymers are produced by blending appropriate amounts of an aliphatic mercapto alcohol with a chlorine-containing polymer in any expedient manner. A particularly convenient method comprises swelling the polymer with an organic solvent such as acetone, adding the aliphatic mercapto alcohol to the resulting material, and mixing thoroughly in a Banbury mixer. Plasticizers and pigments can be introduced at the same time, and removal of the voltaile solvent can be accomplished either in the mixer or on heated milling rolls. Other methods of blending the polymers and mercapto alcohols, for example, mixing on heated rolls without added solvent, will be apparent to those skilled in the art.

The following examples, in which the parts are by weight, further illustrate but do not limit the invention.

Example 1

Ten parts of polyvinyl chloride was thoroughly wet with a methanol solution containing 0.2 part of thiosorbitol. After thorough stirring of the resulting slurry, the methanol was evaporated by a slow current of air and the resulting polymer dried. Sheets were pressed from this modified polymer at a temperature of 160° C. and at a pressure of about 1000 lbs./sq. in. for 1 minute. The resulting sheet was clear and practically colorless while a sheet pressed from unmodified polyvinyl chloride was dark amber in color.

Example 2

To 100 parts of a copolymer of vinyl chloride with diethyl fumarate, prepared by the copolymerization of five parts of diethyl fumarate with 95 parts of vinyl chloride in the manner described in copending applications Serial Nos. 427,921, filed January 23, 1942, or 458,737, filed Sept. 17, 1942, there was added 1.5 parts of thiosorbitol and 1.0 part of magnesium stearate. This composition was thoroughly mixed for 30 minutes on a rubber mill heated at a temperature of approximately 155° C. The resulting composition was practically colorless, indicating that no decomposition had taken place. The same copolymer composition free of mercapto alcohol, underwent discoloration and decomposition when heated on the rubber mill.

Pigments, plasticizers, or other material can be added to the copolymer during or subsequent to the milling operation, and the stabilized copolymer can be applied to cloth to give a tough coating. These products compounded as described above are superior in light and heat stability to corresponding polymers having no aliphatic mercapto alcohol.

In contrast to the superior heat and color stability conferred upon vinyl chloride-diethyl fumarate copolymers by aliphatic mercapto alcohols, simple aromatic or aliphatic thiols have given markedly inferior results. These thiols included beta-thionaphthol, heptadecanethiol-1, the dithiol prepared from vinylcyclohexene, dimercaptonaphthalene, and a polyethylene sulfide having terminal thiol groups.

Example 3

To 8.5 parts of a vinyl chloride copolymer prepared by the copolymerization of five parts of diethyl fumarate with 95 parts of vinyl chloride, there was added 0.085 part each of 1,6-dithiomannitol and magnesium stearate. After thorough mixing, this composition was homogenized on a smooth rubber mill by heating at 155–160° C. for about three minutes, and removed in the form of a sheet. Films pressed or calendered from this stabilized vinyl chloride copolymer were found to be colorless and stable.

The addition of 25-40% by weight of plasticizers, such as di(butoxyethyl) sebacate, dibutyl phthalate, tricresyl phosphate, methoxymethyl acetylricinoleate, etc., which may be readily incorporated into chlorine-containing polymers, or copolymers, yields pliable compositions suitable for films or for applications by calendering technique to fabrics.

Alkaline earth salts of organic aliphatic acids containing more than ten carbon atoms such as magnesium oleate, calcium stearate, calcium 12-ketostearate as described in Examples 2 and 3 may be blended with chlorine-containing polymers in combination with the aliphatic mercapto alcohols of this invention to effect further improvements in heat and light stability. The amount of alkaline earth salt of organic aliphatic acid to be used is usually between 0.1 and 5% based on the weight of the chlorine-containing polymers. These compositions which contain combinations of aliphatic mercapto alcohol and alkaline earth salts of organic aliphatic acids are particularly useful when the compositions are subjected to high temperature calendering operations.

The aliphatic mercapto alcohol may also be incorporated into the chlorine-containing polymer by mixing the polymer with a solution of the mercapto alcohol in a solvent which is a nonsolvent for the polymer. Upon evaporation of the solvent, the mercapto alcohol is uniformly distributed through the polymer. The lower boiling aliphatic alcohols are examples of solvents that can be used for this purpose.

Stabilized coating compositions based on chlorine-containing polymers can be prepared by dissolving the polymer in a suitable solvent to which the aliphatic mercapto alcohol, usually in amounts of 0.5 to 3.0% based on the weight of the polymer, is added. The resulting solution, either with or without the addition of plasticizers, pigments, dyes, etc., may then be used for lacquers, spinning of fibers, casting of film, as fabric coating compositions, and other similar applications.

The chlorine-containing polymers coming within the scope of this invention include polymers and copolymers of vinyl chloride, vinyl chloride polymers which have subsequently been further chlorinated, chlorinated polyethylene, chlorinated rubber, and polymers and copolymers of vinylidene chloride. Of the copolymers of vinyl chloride, vinyl chloride-vinyl ester copolymers such as vinyl chloride-vinyl acetate copolymers and in particular vinyl chloride-alpha, beta-butenedioic dialkyl esters have been found to be particularly effectively stabilized by an aliphatic mercapto alcohol. The preparation of copolymers of vinyl chloride and certain alpha, beta-butenedioic dialkyl esters e. g. diethyl or dimethyl fumarate or maleate is disclosed in pending applications Serial Nos. 427,921, and 458,737.

Of the aliphatic mercapto alcohols useful for the stabilization of the chlorine-containing polymers there are included mercapto butanols, mercapto propanediols, and in particular aliphatic mercapto alcohols obtained by the reaction of an aliphatic hydroxycarbonyl compound with hydrogen and hydrogen sulfide in the presence of a sulfactive catalyst as described in the process of copending application Serial No. 357,417, filed September 19, 1940. These include the following compounds: thiosorbitol, thiodextrose, thiolevulose, thiomannose, or similar thiocarbohydrates in which the carbonyl group in an aldose or ketose sugar is replaced by a C(SH)H grouping. Other compounds useful as stabilizers of chlorine-containing polymers include aliphatic hydroxydithiols such as 1,6-mannitol dithiol and similar compounds. The mercapto polyhydric alcohols are particularly useful.

The stabilizers are preferably used in amount ranging from 0.01 to 5.0% by weight, based on the weight of the chlorine containing polymer.

The compositions of this invention may be used for the preparation of molded plastics, coatings, fibers, films, adhesives, etc.

The above description and examples are intended to be illustrative only. Any modification thereof or variation therefrom which conforms to the spirit of the invention is intended to be included within the scope of the claims.

What is claimed is:

1. A composition comprising a chlorine-containing polymer which tends to liberate HCl on exposure to heat or light and, as a stabilizer therefor against deterioration by heat and light, from 0.01 to 5.0% by weight based on the weight of the polymer, of an aliphatic mercapto alcohol of at least three carbon atoms.

2. A composition comprising a vinyl chloride polymer and, as a stabilizer therefor against deterioration by heat and light, from 0.01 to 5.0% by weight based on the weight of the polymer, of an aliphatic mercapto alcohol of at least three carbon atoms.

3. A composition comprising a copolymer of vinyl chloride with an alpha-beta-butenedioic acid dialkyl ester and, as a stabilizer therefor against deterioration by heat and light, from 0.01 to 5.0% by weight based on the weight of the polymer, of an aliphatic mercapto alcohol of at least three carbon atoms.

4. A composition comprising a chlorine-containing polymer which tends to liberate HCl on exposure to heat or light and, as a stabilizer therefor against deterioration by heat and light, from 0.01 to 5.0% by weight based on the weight of the polymer, of an aliphatic mercapto polyhydric alcohol.

5. A composition comprising a chlorine-containing polymer which tends to liberate HCl on exposure to heat or light and, as a stabilizer therefor against deterioration by heat and light, from 0.01 to 5.0% by weight based on the weight of the polymer, of thiosorbitol.

6. A composition comprising a chlorine-containing polymer which tends to liberate HCl on exposure to heat or light and as stabilizers against deterioration by heat and light from 0.01 to 5.0% each, based on the weight of the polymer, of an aliphatic mercapto alcohol of at least these carbon atoms and an alkaline earth metal salt of a fatty acid of more than ten carbon atoms.

7. A composition comprising a vinyl chloride polymer which tends to liberate HCl on exposure to heat or light and, as a stabilizer therefor against deterioration by heat and light, from 0.01 to 5.0% by weight based on the weight of the polymer, of an aliphatic mercapto polyhydric alcohol.

8. A composition comprising a copolymer of vinyl chloride with an alpha-beta-butenedioic acid dialkyl ester which copolymer tends to liberate HCl on exposure to heat or light and, as a stabilizer therefor against deterioration by heat and light, from 0.01 to 5.0% by weight, based on the weight of the copolymer, of an aliphatic mercapto polyhydric alcohol.

9. A composition comprising a chlorine-containing polymer which tends to liberate HCl on exposure to heat or light and, as stabilizers against deterioration by heat and light, from 0.01 to 5.0% each, based on the weight of the polymer, of an aliphatic mercapto polyhydric alcohol and an alkaline earth metal salt of a fatty acid of more than ten carbon atoms.

10. A composition comprising a vinyl chloride diethyl fumarate copolymer and, as a stabilizer therefor against deterioration by heat and light, from 0.01 to 5.0% by weight, based on the weight of the polymer, of thiosorbitol.

11. A composition containing a copolymer of vinyl chloride with a dialkyl ester of a butenedioic acid ester and, as stabilizers against deterioration by heat and light, from 0.01 to 5.0% each, based on the weight of the copolymer, of an aliphatic mercapto polyhydric alcohol and an alkaline earth metal salt of a fatty acid of more than ten carbon atoms.

12. A composition containing a copolymer of vinyl chloride with a dialkyl ester of a butenedioic acid ester and, as stabilizers against deterioration by heat and light, from 0.01 to 5.0% each, based on the weight of the copolymer, of 1,6-dithiomannitol and magnesium stearate.

13. A composition containing vinyl chloride homopolymer and, as a stabilizer against deterioration by heat and light, from 0.01 to 5.0%, based on the weight of the polymer, of an aliphatic mercapto polyhydric alcohol.

14. A composition containing vinyl chloride homopolymer and, as a stabilizer against deterioration by heat and light, from 0.01 to 5.0%, based on the weight of the polymer, of thiosorbitol.

GEORGE LOWRANCE DOROUGH.

REFERENCES CITED

The following references are of record in the file of this patent:

UNITED STATES PATENTS

| Number | Name | Date |
|---|---|---|
| 2,380,475 | Stewart | July 31, 1945 |

OTHER REFERENCES

Beilstein, Handbuch der Organische Chemie, vol. 1, page 470.